United States Patent [19]
Masamura et al.

[11] Patent Number: 5,878,852
[45] Date of Patent: Mar. 9, 1999

[54] VEHICULAR HEIGHT CONTROL DEVICE

[75] Inventors: Tatuya Masamura, Kani; Masaru Mishima, Gifu, both of Japan

[73] Assignee: Kayaba Kogyo Kabushiki Kaisha, Tokyo, Japan

[21] Appl. No.: 823,856

[22] Filed: Mar. 25, 1997

[51] Int. Cl.⁶ .................................................. F16F 9/48
[52] U.S. Cl. .................................... 188/289; 188/315
[58] Field of Search .................... 188/315, 319.1, 188/289, 322.22, 312; 280/704, 709, 707, 714

[56] References Cited

U.S. PATENT DOCUMENTS 3,595,349   7/1971   Ortheil ................................. 188/289
4,883,150  11/1989   Arai ..................................... 188/289
5,133,434   7/1992   Kikushima et al. .................. 188/319.1

*Primary Examiner*—Peter M. Poon
*Attorney, Agent, or Firm*—McGlew and Tuttle, P.C.

[57] ABSTRACT

A sudden change in the repulsive force of a piston rod and the resulting excessive increase of the vehicular height are to be suppressed.

A small-diameter portion 10A and a large-diameter portion 10B are formed in the inner periphery of a pump cylinder 10, and a valve cover 21 is provided at the lower end of a pump rod 9 so as to accommodate an inlet valve 6 therein. The valve cover 21 has a discharge port 6a which when positioned within the small-diameter portion 10A is closed and which when positioned within the large-diameter portion 10B is opened to a pump chamber 12.

3 Claims, 2 Drawing Sheets

VEHICULAR HEIGHT CONTROL DEVICE

BACKGROUND OF THE INVENTION

1. Field of the Invention

The present invention relates to a vehicular height control device for use in, for example, an automobile, a motorcycle, or an industrial vehicle.

2. Prior Art

As a coventional vehicular height control device, for example, there has been provided such a self-pumping shock absorber as shown in FIG. 2. A brief description will now be given about this conventional device.

In FIG. 2, reference numeral 15 denotes a cylinder disposed within a shell member 16 which is secured to the body of a vehicle. Numeral 11 denotes a piston rod secured to a wheel and having a piston 3 which is adapted to slide within the cylinder 15. Numeral 10 denotes a pump cylinder disposed within the piston rod 11. The pump cylinder 10 defines an oil passage 17 between itself and the piston rod 11, the oil passage 17 being in communication with upper and lower oil chambers 13,13 of a high pressure partitioned by the piston 3.

Numeral 9 denotes a pump rod held at one end thereof by a bottom (inner surface of the upper end) of the shell member 16. The opposite end of the pump rod 9 is inserted into the pump cylinder 10. Halfway through the pump rod 9 is formed a control orifice 2 which is open to the upper oil chamber 13 and which functions to lower the vehicular height.

Numeral 1 denotes an oil reservoir formed in the interior of the shell member 16. The oil reservoir 1 is in communication with a pump chamber 12 through the pump rod 9 and an inlet valve 6, the pump chamber 12 being formed within the lower portion of the pump cylinder 10.

Numeral 7 denotes an outlet valve disposed between the pump chamber 12 located in the lower portion of the pump cylinder 10 and the oil passage 17. Numeral 4 denotes a diaphragm which provides a partition between a high pressure chamber 18 and a gas chamber 5 in the interior of the shell member 16, the high pressure chamber 18 being in communication with the upper oil chamber 13.

Numeral 8 denotes a recess formed in part of the outer periphery of the pump rod 9 at a certain length in an axial direction thereof. The recess 8 functions so as to provide communication between the upper oil chamber 13 and the pump chamber 12 when its upper portion is positioned above the pump cylinder 10.

Next, the operation of this conventional shock absorber will be described. When the vehicular height becomes lower due to an increase in load on the vehicle, the whole of the shock absorber as a vehicular height control device undergoes a compressive force and is compressed thereby. At this time, the control orifice 2 and the recess 8 are positioned within the pump cylinder 10.

In this state, when an exciting force is exerted on the shock absorber during vehicular running, the oil present in the oil reservoir 1 flows, in an expansion stroke of the piston rod 11, into the pump chamber 12 through a communication pipe 19, through an oil passage 20 formed within the pump rod 9, and further through the inlet valve 6, respectively.

On the other hand, in a compression stroke which follows, the oil present in the pump chamber 12 is pressed by the pump rod 9 and flows into the upper oil chamber 13 through the outlet valve 7 and further through the oil passage 17 formed between the pump cylinder 10 and the piston rod 11.

Then, the oil present in the upper oil chamber 13 flows, in an amount corresponding to the volume of the oil which has thus entered the chamber 13, into the high pressure chamber 18 defined by the diaphragm 4 through a small hole 21 formed in the top of the cylinder 15 and further through an oil passage 22 formed along the outer periphery of the cylinder 15.

Consequently, the gas chamber 5 is compressed in proportion to the volume of the oil which has flowed into the high pressure chamber 18, and the chamber 18 becomes high in pressure, so that the repulsive force of the piston rod 11 increases, causing the vehicular height to increase.

On the other hand, the increase in pressure of the upper and lower oil chambers 13,13 and the resulting increase of the vehicular height cause the recess 8 to appear outside the pump cylinder 10, providing communication between the upper oil chamber 13 and the pump chamber 12, with the result that the pump chamber 12 becomes high in pressure.

Consequently, the inlet valve 6 is forced into a closed state, and this increase of the vehicular height is continued until oil is no longer pumped up into the pump chamber 12 from the oil reservoir 1.

Next, as the vehicular height increases with unloading of goods from the vehicle, the shock absorber stretches to the full length thereof, and when the control orifice 2 appears outside the pump cylinder 10, the upper oil chamber 13 and the oil reservoir 1 are brought into communication with each other through the orifice 2.

Accordingly, the oil present in the upper oil chamber 13 flows into the oil reservoir 1, and the capacity of the gas chamber 5 expands in proportion to the volume of the oil which has left the upper oil chamber 13.

As a result, the upper and lower oil chambers 13,13 decrease in pressure and the piston rod 11 becomes less repulsive, thus causing the vehicular height to decrease.

This decrease of the vehicular height continues until the control orifice 2 assumes a position inside the pump cylinder 10 to cut off the flow of oil between the upper oil chamber 13 and the oil reservoir 1.

In the conventional vehicular height control device, since it is constructed as above, a high pressure receiving rod area is equal to the sectional area of the piston rod 11 when the pump chamber 12 communicates with the upper oil chamber 13 through the recess 8, while when both chambers 12 and 13 are not in communication with each other, the high pressure receiving rod area is equal to an area obtained by substracting the sectional area of the pump rod 9 from the sectional area of the piston rod 11. For this reason the conventional device in question has involved the problem that the repulsive force of the piston rod 11 increases suddenly upon switching from the state of non-communication of both chambers to the state of communication in the expansion stroke and that therefore the vehicle becomes less comfortable to ride in and unstable in its steering performance.

In the pumping operation, when oil is sucked from the oil reservoir 1 into the pump chamber 12 in the expansion stroke, the high pressure receiving area is equal to an area obtained by subtracting the sectional area of the pump rod 9 from the sectional area of the piston rod 11.

On the other hand, in the compression stroke in which the oil present in the pump chamber 12 is forced out into the upper oil chamber 13, the high pressure receiving area is equal to the sectional area of the piston rod 11, so that upon switching to the compression stroke the pressure receiving area increases, causing a sudden increase in the repulsive force of the piston rod. This suddenly increased repulsive force acts like friction and thus results in deteriorated comfortableness.

SUMMARY OF THE INVENTION

The present invention has been accomplished for solving the above-mentioned problem of the prior art and it is an object of the invention to provide a vehicular height control device capable of suppressing a sudden change in repulsive force of the piston rod and suppressing an excessive increase of the vehicular height.

According to the present invention, in order to achieve the above-mentioned object, there is provided a vehicular height control device including:

- a shock absorber comprising a cylinder disposed within a shell member, a piston rod inserted movably into the cylinder through a piston, two upper and lower oil chambers partitioned from each other through the piston, and damping valves provided in the piston to open and close the two oil chambers;
- an oil reservoir formed outside the cylinder;
- a high pressure chamber which is pressurized by a gas chamber and which is connected to one of the two oil chambers;
- a pump cylinder inserted into the piston rod; and
- a pump rod inserted movably into the pump cylinder, the pump rod having an oil passage for communication of the oil reservoir with a pump chamber formed within the pump cylinder, an inlet valve for opening and closing the oil passage, and a control orifice for opening and closing the oil passage on the upper oil chamber side, the pump chamber being connected to one of the oil chambers through an outlet valve disposed within the pump cyliner and further through a flow path formed between the pump cylinder and the piston rod, characterized in that:
    - in the inner periphery of the pump cylinder are formed an upper small-diameter portion and a lower large-diameter portion; and
    - a valve cover for receiving the inlet valve therein is provided at the lower end of the pump rod, with a discharge port being formed in the valve cover, the discharge port being closed within the small-diameter portion and opened within the large-diameter portion.

Preferably, the large-diameter portion is formed by recessing the inner periphery of the lower portion of the pump cylinder.

Preferably, the valve cover is a bottomed, cylindrical cover and is threadedly engaged with the lower end of the pump rod, the inlet valve is urged in its closing direction by means of a spring disposed within the valve cover, and the discharge port is formed in the side portion of the valve cover.

DESCRIPTION OF THE PREFERRED EMBODIMENT

An embodiment of the present invention will be described hereinunder with reference to the accompanying drawings.

Figure 1:
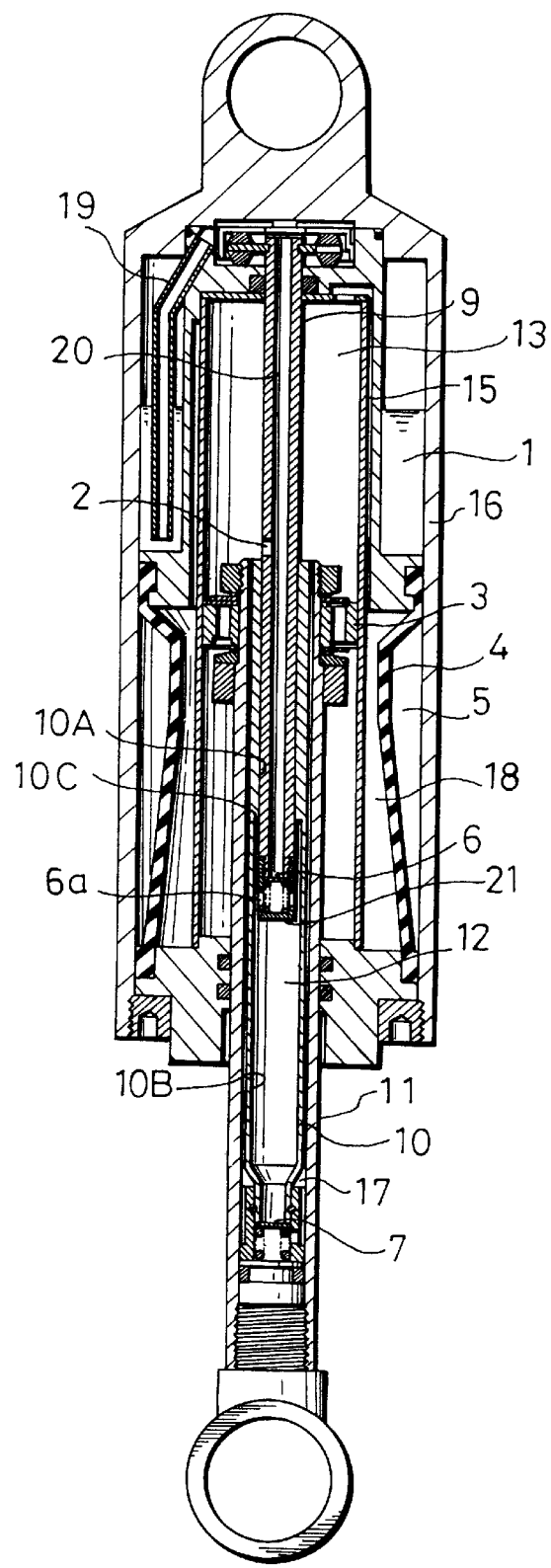
FIG. 1 is a front view in longitudinal section of a vehicular height control device according to an embodiment of the present invention.

FIG. 1 is a sectional view of a vehicular height control device embodying the present invention. In the same figure, reference numeral 1 denotes an oil reservoir, numeral 2 a control orifice, numeral 3 a piston, 4 a diaphragm, 5 a gas chamber, 6 an inlet valve, 7 an outlet valve, 9 a pump rod, and 10 a pump cylinder.

Further, numeral 11 denotes a piston rod, numeral 12 a pump chamber, numeral 13 a high pressure chamber which is partitioned by the piston 3 into an upper oil chamber and a lower oil chamber, numeral 15 denotes a cylinder, 16 a shell member, 17 an oil passage, 18 a high pressure chamber, 19 a communication pipe, and 20 an oil passage.

Figure 2:
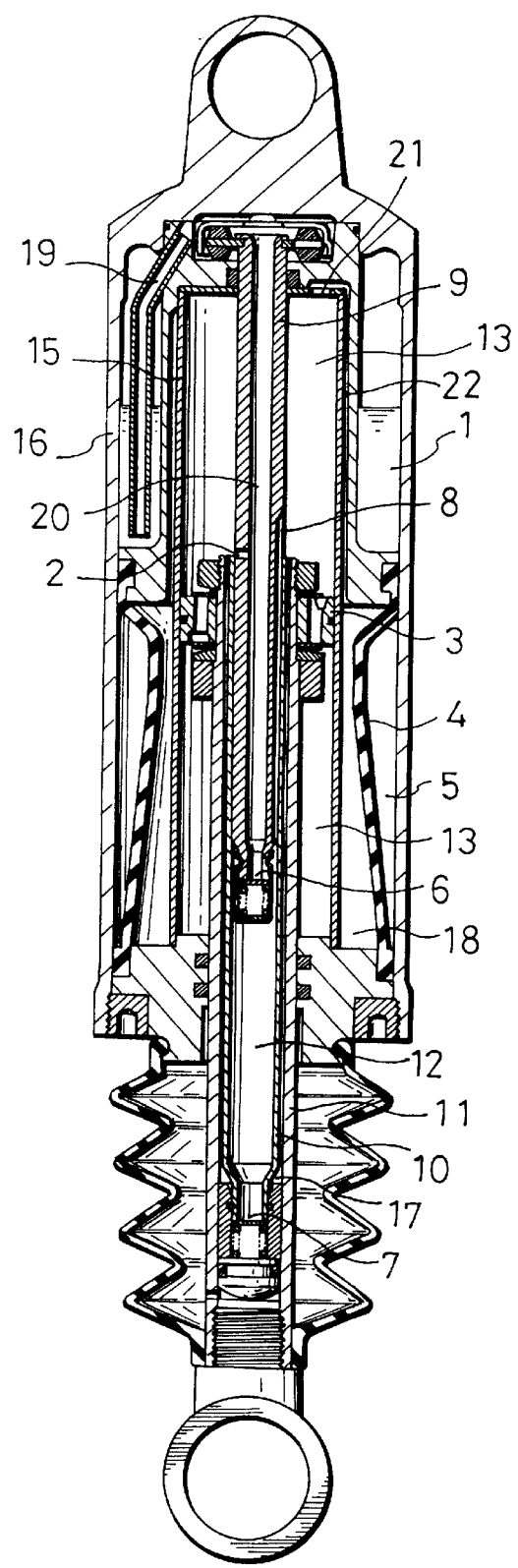
FIG. 2 is a front view in longitudinal section of a conventional vehicular height control device.

The above components from the oil reservoir 1 up to the oil passage 20 are in the same structural correlation as that shown in FIG. 2.

To be more specific, the piston rod 11 is movably inserted into the cylinder 15 through the piston 3. The piston 3 partitions the interior of the cylinder 15 into upper and lower oil chambers 13,13. The two oil chambers 13,13 communicate with each other through an expansion port and a compression port both formed in the piston 3. At outlet ends of the two ports are provided an expansion-side damping valve and a compression-side damping valve, respectively, for opening and closing motion. These components constitute a shock absorber. The shock absorber itself is connected to the vehicle body side and a wheel axle through an eye of the shell member 16 located outside the cylinder 15 and an eye provided at an outer end of the piston rod 11.

Between the cylinder 15 and the shell member 16 are formed the oil reservoir 1 and the high pressure chamber 18 which is pressurized by the gas chamber 5. The high pressure chamber 18 is connected to the upper oil chamber 13 through an oil passage formed outside the cylinder 15.

Into the piston rod 11, which is hollow, is inserted the pump cylinder 10 which is also hollow. Further, into the pump cylinder 10 is movably inserted the pump rod 9 which is hollow and which extends straight and downward from the upper portion of the shell member 16.

The pump rod 9 is provided with the oil passage 20 which provides communication between the oil reservoir 1 and the pump chamber 12 formed in the pump cylinder 10, a discharge port 6a the inlet valve 6 for opening and closing the oil passage 20, and the control orifice 2 for opening and closing the oil passage 20 on the upper oil chamber 13 side.

The pump chamber 12 is opened and closed with respect to the upper oil chamber 13 through the lower outlet valve 7 and further through the oil passage 17 formed between the pump cylinder 10 and the piston rod 11.

In the inner periphery of an upper portion, up to near the middle portion, of the pump cylinder 10 is formed a small-diameter portion 10A, and under the small-diameter portion 10A is formed a large-diameter portion 10B through a stepped portion 10C. The large-diameter portion 10B is formed by recessing the inner periphery of the lower portion of the pump cylinder 10.

To the lower end of the pump rod 9 is threadedly connected a bottomed, cylindrical valve cover 21 which has an outside diameter almost equal to that of the pump rod 9 and which receives the inlet valve 6 therein. In the side portion of the valve cover 21 is formed the discharge port 6a which is closed within the small-diameter portion 10A and which is opened to the pump chamber 12 within the large-diameter portion 10B. The inlet valve 6 is urged in its closing direction by means of a spring disposed within the valve cover 21.

The pumping operation in this embodiment is the same as that described previously in connection with FIG. 2. As a result of the pumping operation, the internal pressure of both upper and lower oil chambers 13,13 increases and the vehicular height increases in the direction of extraction of the pump rod 9 from the interior of the pump cylinder 10, so that the discharge port 6a of the pump cover 21 gets into the small-diameter portion 10A of the pump cylinder 10 and is closed thereby. This expanding motion is continued until the oil is no longer pumped up from the oil reservoir 1 into the pump chamber 12. In this way it is possible to increase the vehicular height.

By cutting off the communication of the pump chamber 12 with the upper oil chamber 13, a high pressure receiving rod area in the expansion stroke becomes equal to a constant value obtained by subtracting the sectional area of the pump rod 9 from that of the piston rod 11.

Consequenlty, it is possible to eliminate the fear of a sudden increase of the vehicular height caused by a sudden change in repulsive force of the piston rod halfway in stroke, and hence it is possible to improve the comfortableness and steering stability of the vehicle. Besides, an excessive increase of the vehicular height can be prevented by suppressing the pumping operation.

Although in the above embodiment the shell member 16 and the piston rod 11 are disposed in upper and lower positions, respectively, and the upper oil chamber 13 and the oil reservoir 1 are disposed in the upper bottom portion of the shell member, the shell member and the piston rod may be disposed in lower and upper positions, respectively, and in this case the high pressure chamber and the oil reservoir may be formed on the upper opening end side (packing case mounted side) of the shell member. Even with this arrangement there are obtained the same function and effect as in the above embodiment insofar as a discharge port is formed in the valve case which covers the inlet valve in such a manner that inside the pump cylinder the discharge port is closed and outside the pump cylinder it is opened to the pump chamber.

Further, although in the above embodiment the diaphragm is disposed in the space between the shell member 16 and the cylinder 15, an oil chamber and a gas chamber may be partitioned from each other within a casing which is formed outside the shell member 16 through a pipe communicating with the said space. Even in this case there can be attained the same effect as in the above embodiment.

According to the construction of the present invention, as set forth above, small-and large-diameter portions are formed in the inner periphery of the pump cylinder, and a valve cover for receiving the inlet valve therein is connected to the lower end of the pump rod, the valve cover having a discharge port which when positioned within the small-diameter portion is closed and which when positioned within the large-diameter portion is opened to the pump chamber.

With this construction, a sudden change in the repulsive force of the piston rod and the resulting excessive increase of the vehicular height can be diminished efficiently.

What is claimed is:

1. A vehicular height control device including:

a shock absorber comprising a cylinder disposed within a shell member, a piston rod inserted movably into said cylinder through a piston, two upper and lower oil chambers partitioned from each other through said piston, and damping valves provided in said piston to open and close said two oil chambers;

an oil reservoir formed outside said cylinder;

a high pressure chamber which is pressurized by a gas chamber and which is connected to one of said two oil chambers;

a pump cylinder inserted into said piston rod; and a pump rod inserted movably into said pump cylinder, said pump rod having an oil passage for communication of said oil reservoir with a pump chamber formed within the pump cylinder, an inlet valve for opening and closing said oil passage, and a control orifice for opening and closing said oil passage on said upper oil chamber side, said pumpchamber being connected to one of said oil chambers through an outlet valve disposed within said pump cylinder and further through a flow path formed between the pump cylinder and the piston rod, characterized in that:

in the inner periphery of said pump cylinder are formed an upper small-diameter portion and a lower large-diameter portion; and a valve cover for receiving said inlet valve therein is provided at the lower end of said pump rod, with a discharge port being formed in said valve cover, said discharge port being closed within said small-diameter portion and opened within said large-diameter portion.

2. A vehicular height control device according to claim 1, wherein said large-diameter portion is formed by recessing the inner periphery of the lower portion of said pump cylinder.

3. A vehicular height control device according to claim 1, wherein said valve cover is a bottomed, cylindrical cover and is threadedly engaged with the lower end of said pump rod, said inlet valve is urged in its closing direction by means of a spring disposed within the valve cover, and said discharge port is formed in the side portion of the valve cover.

* * * * *